US007343170B1

(12) United States Patent
Feeney et al.

(10) Patent No.: US 7,343,170 B1
(45) Date of Patent: Mar. 11, 2008

(54) SYSTEM AND METHOD FOR ALLOWING NODES IN A WIRELESS COMMUNICATION NETWORK TO ACCESS MULTIPLE CHANNELS

(75) Inventors: Michael S. Feeney, Allen, TX (US);
Fred D. Mabe, Marion, IA (US);
James A. Stevens, Allen, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 666 days.

(21) Appl. No.: 10/897,154

(22) Filed: Jul. 21, 2004

(51) Int. Cl.
*H04B 7/00* (2006.01)

(52) U.S. Cl. ................. 455/509; 455/507; 455/502; 455/501; 370/320; 370/330; 370/337; 370/254; 370/227

(58) Field of Classification Search ........ 370/328–338, 370/320, 254, 227; 455/509, 507, 502, 501
See application file for complete search history.

(56) References Cited

U.S. PATENT DOCUMENTS

| | | | |
|---|---|---|---|
| 5,719,868 A * | 2/1998 | Young ..................... 370/436 |
| 5,949,760 A | 9/1999 | Stevens et al. |
| 6,317,436 B1 | 11/2001 | Young et al. |
| 6,331,973 B1 * | 12/2001 | Young et al. ............. 370/337 |
| 6,487,186 B1 | 11/2002 | Young et al. |
| 6,504,829 B1 | 1/2003 | Young et al. |
| 6,515,973 B1 | 2/2003 | Young |
| 6,574,199 B1 * | 6/2003 | Young et al. ............. 370/254 |
| 6,574,206 B2 | 6/2003 | Young |
| 6,600,754 B1 | 7/2003 | Young et al. |
| 6,628,636 B1 | 9/2003 | Young |
| 6,711,177 B1 | 3/2004 | Young |
| 6,980,819 B2 * | 12/2005 | Sugaya et al. ........... 455/501 |
| 2002/0075941 A1 * | 6/2002 | Souissi et al. ........... 375/133 |
| 2003/0067906 A1 * | 4/2003 | Young ..................... 370/347 |
| 2004/0100929 A1 * | 5/2004 | Garcia-Luna-Aceves .... 370/338 |

\* cited by examiner

*Primary Examiner*—Rafael Perez-Gutierrez
*Assistant Examiner*—Khai Nguyen
(74) *Attorney, Agent, or Firm*—Nathan O. Jensen; Kyle Eppele (57) ABSTRACT

A method for allowing a node in a wireless communication network to access time slot assignment information on multiple channels includes assigning the node to a first channel associated with a channelized neighborhood having a plurality of nodes. The node communicates in accordance with an access protocol having a common channel frame portion and a channelized frame portion. A plurality of staggered channelized bootstrap slot sections are provided in the channelized frame portion. Each channelized bootstrap slot section is associated with a different channel and offset in time from the other channelized bootstrap slot sections.

22 Claims, 5 Drawing Sheets

SYSTEM AND METHOD FOR ALLOWING NODES IN A WIRELESS COMMUNICATION NETWORK TO ACCESS MULTIPLE CHANNELS

STATEMENT REGARDING FEDERALLY SPONSORED RESEARCH OR DEVELOPMENT

The invention was made with U.S. Government support under Contract No. DAAB07-01-3-L533. The U.S. Government has certain rights in the invention.

FIELD OF THE INVENTION

The invention relates generally to communication networks and in particular, to a system and method for allowing nodes in a wireless communication network to access multiple channels and exchange local channel time slot information.

BACKGROUND

Tactical military and commercial applications require self-organizing, wireless networks that can operate in dynamic environments and provide peer-to-peer, multi-hop, multi-media communications. Key to this technology is the ability of neighboring nodes to transmit without interference. Neighboring nodes transmit without interference by choosing time slots and channels that do not cause collisions at the intended unicast or multicast receivers. This functionality is provided by the Unifying Slot Assignment Protocol (USAP) which is the subject of U.S. Pat. No. 5,719,868, the disclosure of which is herein incorporated by reference. The function of USAP is to monitor the RF environment and allocate the channel resources on demand and automatically detect and resolve contention resulting from changes in connectivity.

A structured wireless channel access scheme such as Time Division Multiple Access (TDMA) may be used in an ad hoc wireless network. TDMA is a channel access technique in which a frequency channel is divided into time slots and each time slot is assigned to a user. Accordingly, multiple transmissions may be supported on a single frequency channel. In particular, a multi-frequency (or multi-channel) time division multiple access format such as Orthogonal Domain Multiple Access (ODMA) may be utilized. Multi-channel time-division multiple access is the subject of U.S. Pat. Nos. 5,949,760; 6,317,436; 6,331,973; 6,487,186; 6,504,829; 6,515,973; 6,574,199; 6,574,206; 6,600,754; 6,628,636 and 6,711,177, the disclosures of which are herein incorporated by reference.

A wireless communications network may include advantaged nodes which have enhanced visibility or connectivity to other nodes in the network. An example of an advantaged node is an airborne node such as an airplane flying over a battlefield. An advantaged node may be on other platforms such as s land-based platform, a space-based platform, a naval-based platform, etc. A non-advantaged node, e.g., a ground node, in a network may only have a small number of one-hop neighbor ground nodes due to the presence of hills, buildings and other terrain that may limit the RF connectivity between non-advantaged nodes. Non-advantaged nodes may be on other platforms such as a space-based platform, a naval-based platform, an air-based platform, etc. An advantaged node (e.g., an airplane node), however, is not hindered by such terrain and may, therefore, have a larger number of one-hop neighbor nodes than a non-advantaged node.

Congestion at the routing layer at an advantaged node may occur due to high demand by the non-advantaged nodes to use the advantaged node as a relay node to communicate with other non-advantaged nodes. In addition, congestion at the multiple-access layer (MAC layer) may also occur when too many non-advantaged nodes contend for access to the advantaged node at the same time. One solution to the problem of congestion at the MAC layer is to allow only a limited number of designated non-advantaged nodes, or access points, to send traffic to and receive traffic from an advantaged node. Accordingly, an access point exchanges traffic with other non-advantaged nodes as well as advantaged nodes. Typically, advantaged nodes are assigned to a separate physical channel (e.g., a separate RF channel) than the non-advantaged nodes. Therefore, an access point is required to participate on both the non-advantaged node channels and the advantaged node channel.

Accordingly, there is a need for system and method that allows a node, for example, an access point, in a wireless communication network to access multiple channels. In particular, there is a need for a system and method that allows a node to fully participate in the exchange of local time slot information on multiple channels. Further, there is a need for a system and method that allows an access point (e.g., a non-advantaged node) to fully participate in the exchange of local time slot information on the access points' channel and an advantaged node's channel.

SUMMARY

In accordance with one embodiment, a method for allowing a node in a wireless communication network to access time slot assignment information on multiple channels, the node communicating in accordance with an access protocol having a common channel frame portion and a channelized frame portion, includes assigning the node to a first channel associated with a channelized neighborhood having a plurality of nodes and providing a plurality of staggered channelized bootstrap slot sections in the channelized frame portion, each channelized bootstrap slot section associated with a different channel and offset in time from the other channelized bootstrap slot sections.

In accordance with another embodiment, a method for providing a non-advantaged node in a wireless communication network access to time slot assignment information on a channel associated with an advantaged node, the non-advantaged node and advantaged node communicating in accordance with an access protocol having a common channel frame portion and a channelized frame portion, includes assigning the non-advantaged node to a first channel associated with a channelized neighborhood having a plurality of nodes, providing a first channelized bootstrap slot section for the first channel in the channelized frame portion, and providing a second channelized bootstrap slot section for a channel associated with the advantaged node in the channelized frame portion, the second channelized bootstrap slot section offset in time from the first channelized bootstrap section.

In accordance with yet another embodiment, a wireless communication network includes a plurality of channelized neighborhoods, each channelized neighborhood including a plurality of nodes assigned to a channel and a multi-channel time division multiple access structure having a common channel frame portion and a channelized frame portion. The multi-channel time division multiple access structure includes a slot assignment protocol, a plurality of synch slots in the common channel frame portion, a plurality of global bootstrap slots in the common channel frame portion, a plurality of staggered channelized bootstrap slot sections in the channelized frame portion, each channelized bootstrap slot section associated with a different channel and offset in time from the other channelized bootstrap slot sections, and a plurality of user traffic slot sections, each user traffic slot section associated with a different channel.

In accordance with another embodiment, a wireless communication network includes at least one advantaged node, a plurality of non-advantaged nodes including at least one access point node, the access point node configured to communicate with the at least one advantaged node, a first channelized neighborhood including a first subset of the plurality of non-advantaged nodes assigned to a first channel including the access point node, a second channelized neighborhood including the at least one advantaged node and assigned to a second channel and a multi-channel time division multiple access structure having a common channel frame portion and a channelized frame portion. The multi-channel time division multiple access structure includes a slot assignment protocol; a plurality of synch slots in the common channel frame portion, a plurality of global bootstrap slots in the common channel frame portion, a first channelized bootstrap slot section for the first channel in the channelized frame portion, a second channelized bootstrap slot section for the second channel in the channelized frame portion, the second channelized bootstrap slot section offset in time from the first channelized bootstrap slot section, a first user traffic slot section associated with the first channel, and a second user traffic slot section associated with the second channel.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
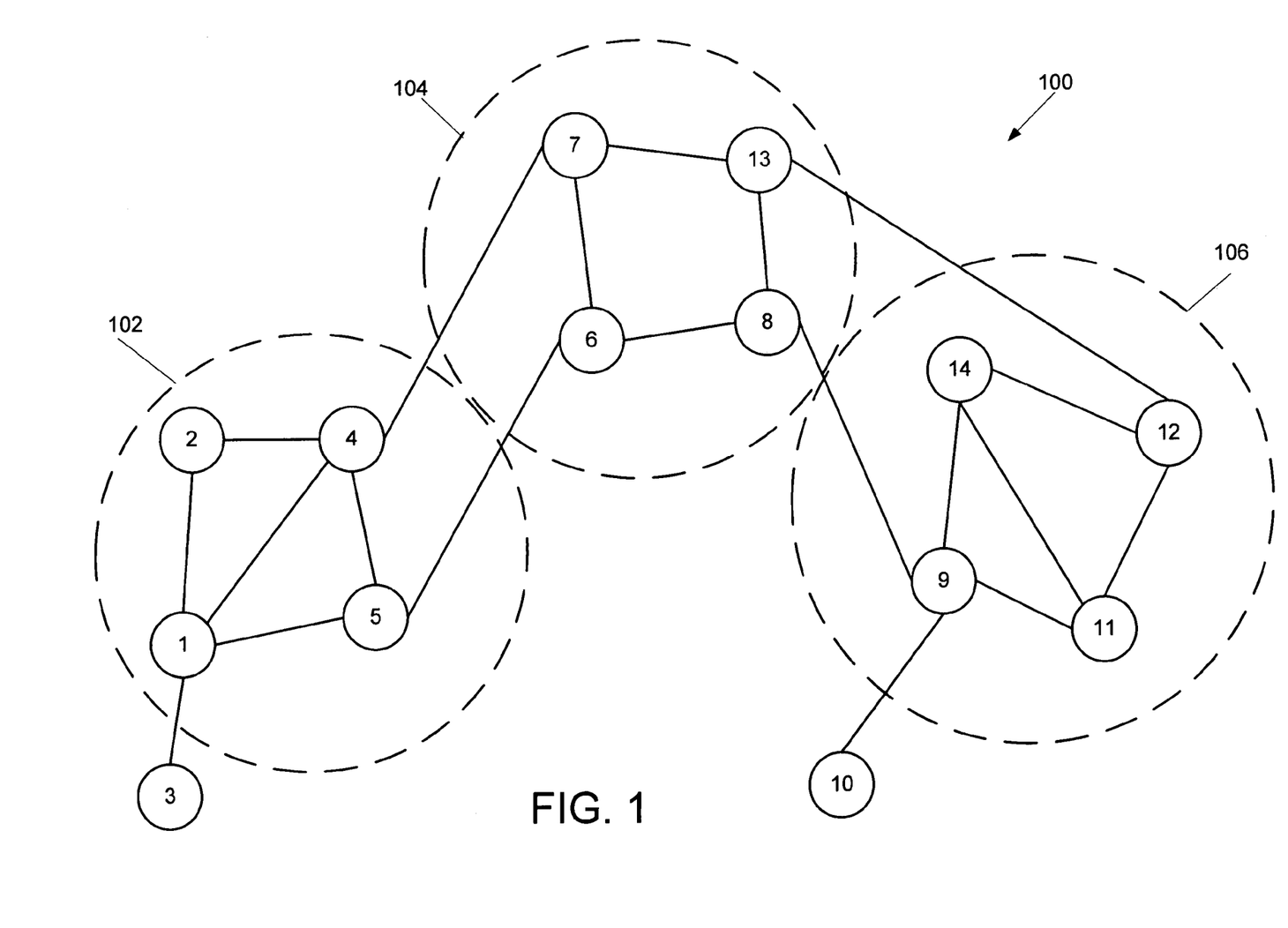
FIG. 1 is a diagram of a wireless communication network having a plurality of nodes in accordance with an embodiment.

FIG. 1 is a diagram of a wireless communication network 100 including a plurality of nodes in accordance with an embodiment. In an exemplary embodiment, wireless communication network 100 may be, for example, a Joint Tactical Radio System (JTRS). Wireless communication network 100 includes channelized neighborhoods 102, 104, 106 that separate the nodes of network 100 onto different default channels (or frequencies) for communication and allow for spatial frequency reuse within network 100. Channelized network 102 consists of nodes 1, 2, 4 and 5 that are each assigned to a first default channel. Channelized network 104 consists of nodes 6, 7, 8 and 14 that are each assigned to a second default channel. Channelized neighborhood 106 includes consists of nodes 9, 11, 12 and 13 that are assigned to a third default channel. Typically, nodes that exchange large amounts of traffic with one another are assigned to the same default channel. A transmission from one node is broadcast to all nodes in it's neighborhood on the default channel, for example, these nodes within the line of sight or one-hop of the transmitting node. Typically, for the transmitted data to propagate multiple hops, the data must be relayed by one or more of these neighbors to the nodes that are two hops away from the original transmitting node. Nodes within each channelized neighborhood may also communicate with nodes outside their particular channelized neighborhood, i.e., inter-channel communication (for example, node 4 may communicate with node 7 on the second default channel). Each node in network 100 may include a single simplex transceiver and an unidirectional antenna. Thus, a node cannot transmit and receive data at the same time, and a node cannot receive data from more than one node at a time.

Figure 2:
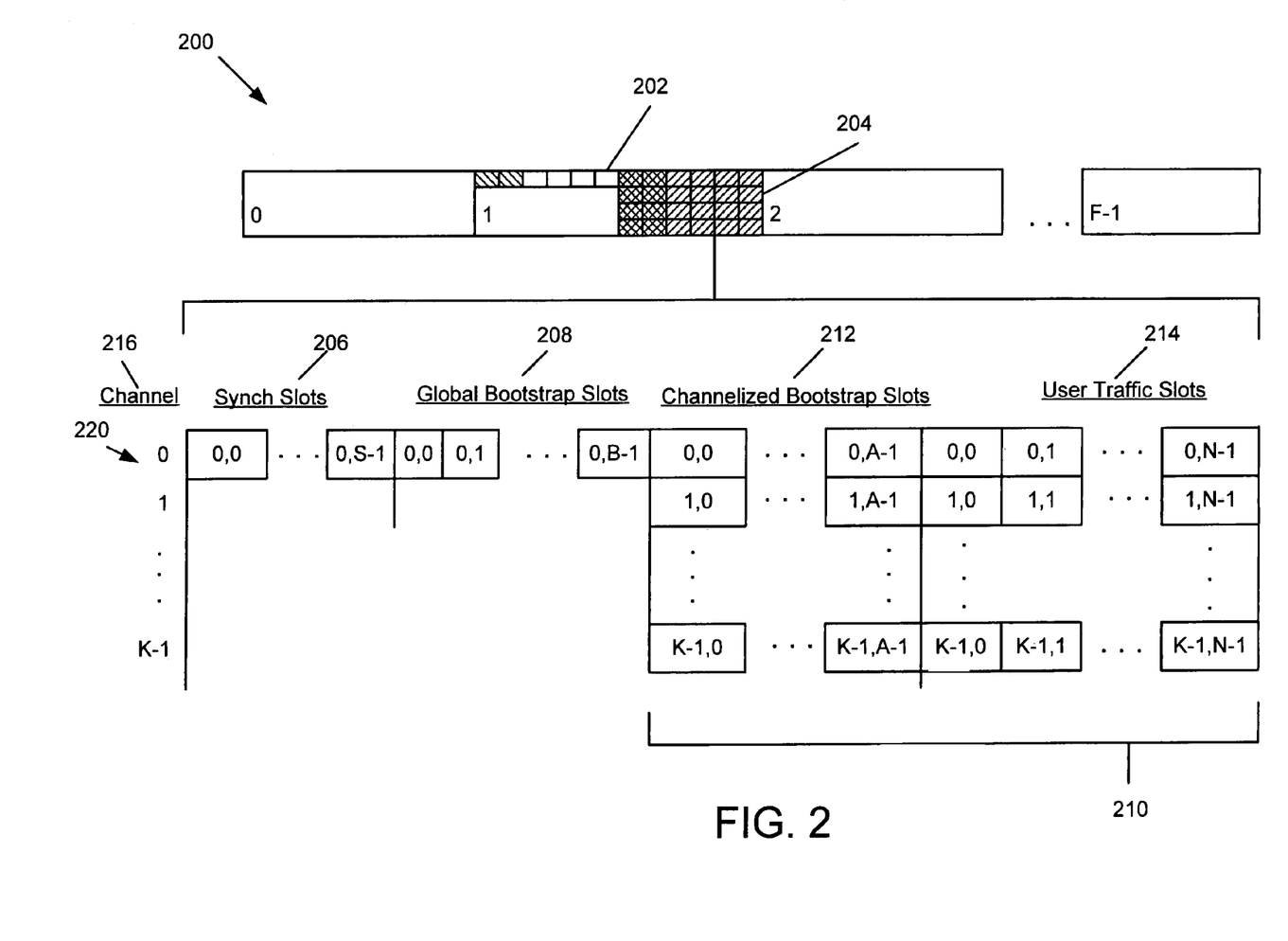
FIG. 2 is a diagram of a multi-channel TDMA structure in accordance with an embodiment.

Preferably, each node in network 100 communicates in accordance with a time division multiple access (TDMA) technique such as a multi-channel TDMA format, e.g., Orthogonal Domain Multiple Access (ODMA). Slot assignments may be coordinated using Unifying Slot Assignment Protocol (USAP). FIG. 2 is a diagram of a multi-channel TDMA structure in accordance with an embodiment. Multi-channel TDMA structure 200 includes a plurality of frames 202 that are associated with a plurality of non-overlapping radio frequency channels 204, 216, as mentioned above with respect to FIG. 1, nodes in network 100 are divided and grouped onto different default channels, i.e., into channelized neighborhoods.

Returning to FIG. 2, each frame 202 is divided into four sections, synch slots 206, global bootstrap slots 208, channelized bootstrap slots 212, and user traffic slots 214. Synch slots 206 and global bootstrap slots 208 are provided on a network-wide common frequency channel 220. In one embodiment, common channel 220 may be pseudo-randomized using known methods to enhance security of the common channel. Each node in network 100 (see FIG. 1) receives and/or transmits information on common channel 220 during the synch slots 206 section and the global bootstrap slots 208 section of frame 202. Synch slots 206 are used to communicate information needed to allow partitioned networks to merge including when the two partitions are not time synchronized with one another. A global bootstrap slot 208 is assigned to each node in network 100 (see FIG. 1). Global bootstrap slots 208 are, therefore, contentionless slots. Global bootstrap slots 208 are used to carry USAP assignment information and provide a means by which each node may discover their neighbors, either belonging to the same default channel or a different channel. A global bootstrap slot 208 includes at least the following information: 1) the transmitting nodes identification, 2) the transmitting nodes status and 3) slot assignment information (i.e., USAP information) necessary to reserve user traffic slots.

As mentioned above, a global bootstrap slot 208 is assigned to each node in network 100. A global bootstrap cycle is the amount of time it takes for each node in network 100 to transmit a global bootstrap slot. For example, a network with 800 nodes running at 8 frames per second with 10 global bootstrap slots per frame would have a global bootstrap cycle of 10 seconds. In other words, each node would transmit in a global bootstrap slot once in every 10 second interval.

Channelized bootstrap slots 212 and user traffic slots 214 occur in a channelized portion 210 of frame 202, i.e., on the various channels 216. A node receives and/or transmits on the common channel during the synch slot 206 and global bootstrap slot 208 sections of frame 202 and then switches to its default channel for the channelized bootstrap slot 212 section of frame 202. The user traffic slot 214 section of frame 202 is configured to support inter-channel communication and, therefore, a node may switch between it's default channel and the various other channels on which it needs to communicate during the time slots in the user traffic slot section 214 of frame 202. Channelized bootstrap slots 212 are used to communicate slot assignment information (i.e., reservations to schedule a time slot and frequency to send and/or receive information) for the user traffic slots of a particular channel as well as channelized bootstrap slot assignment information. For each channel, a channelized bootstrap slot is assigned to each node assigned to the particular channel (i.e., a node belonging to the channel's channelized neighborhood). Typically, a channelized bootstrap cycle is shorter in length than a global bootstrap cycle because only a subset of the nodes in network 100 (i.e., nodes in a particular channelized neighborhood) are communicating on each channel during the channelized bootstrap slots for that channel.

User traffic slots may be broadcast or unicast slots. Broadcast slots may be used for multicast transmissions to other nodes on the same channel. Unicast slots may be used for inter-channel communication. As mentioned above, user traffic slots may be reserved via either global bootstrap slots 208 or channelized bootstrap slots 212. In one embodiment, in which the wireless communication network is a JTRS network, user traffic slots may include, for example, rotating broadcast slots and fixed reservation slots.

Figure 3:
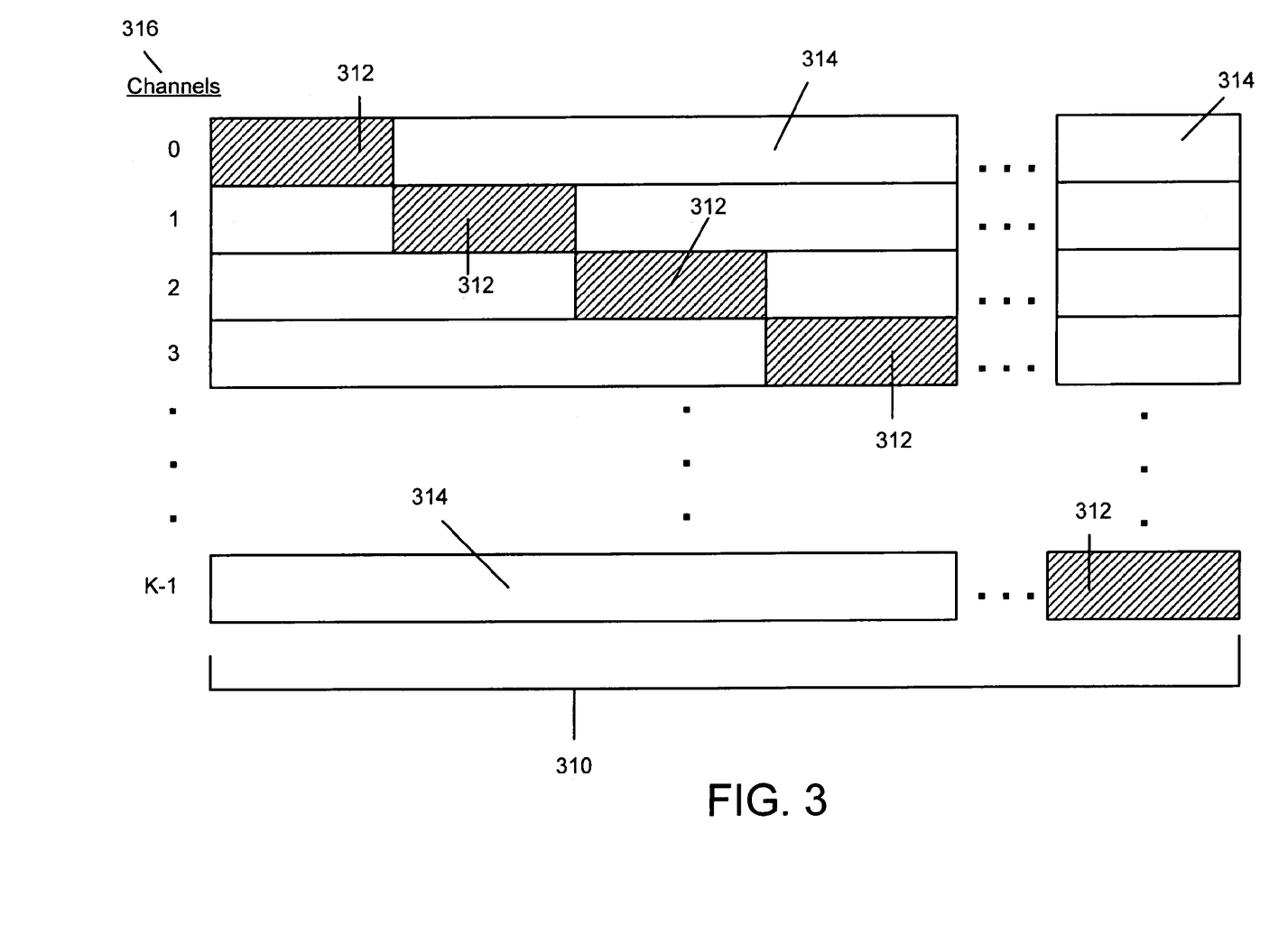
FIG. 3 is a diagram of a staggered bootstrap slot configuration for a channelized section of the multi-channel TDMA structure of FIG. 2 in accordance with an embodiment.

The channelized portion 210 of frame 202 may be configured to allow a node in network 100 (see FIG. 1) to access multiple channels and fully participate in the exchange of local channel time slot information on multiple channels using staggered channelized bootstrap slot sections. FIG. 3 is a diagram of a staggered bootstrap slot configuration for a channelized section of the multi-channel TDMA structure of FIG. 2 in accordance with an embodiment. In FIG. 3, a channelized bootstrap slot section 312 on each channel 316 is off set in time from the channelized bootstrap slot sections on the other channels. User traffic slots 314 occur in the remaining time slot sections for each channel in the channelized section 310 of the frame. As shown in FIG. 3, the staggered channelized bootstrap slot sections are non-overlapping across channels 316. Accordingly, a node may participate in and exchange local channel time slot information on more than one channel by switching to a particular channel during the channelized bootstrap section 312 of that channel. The node may then receive all of the slot reservation information being sent out in the channelized bootstrap slots of the particular channel as well as transmit its own slot assignment information on the particular channel. The node may then switch to yet another channel and listen to and/or transmit time slot information on the channelized bootstrap slots of that channel. For example, a node having channel 1 as a default channel may first participate in (i.e., listen to time slot information (e.g., USAP information) of other nodes and transmit its own time slot information) the channelized bootstrap slots of channel 1 and then switch to channel 2 during the channelized bootstrap slot section 312 of channel 2 to receive and transmit time slot information on channel 2. Accordingly, a node may fully participate in the exchange of local channel time slot information on multiple channels.

Figure 4:
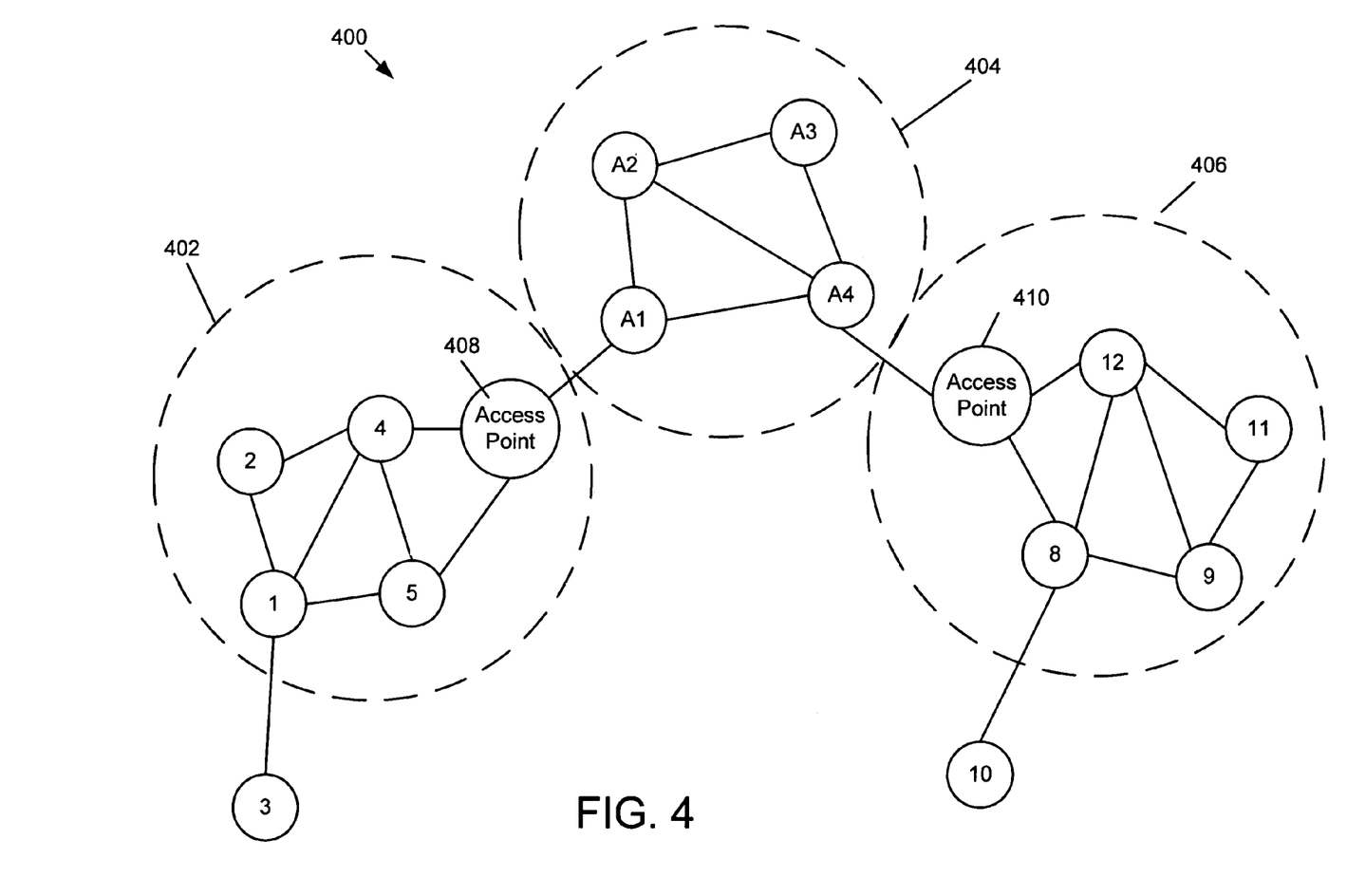
FIG. 4 is a diagram of a wireless communication network including advantaged nodes in accordance with an embodiment.

Referring now to FIG. 4, a wireless communication network 400 is shown including advantaged nodes A1-A4 in accordance with an embodiment. Wireless communication network 100 includes channelized neighborhoods 402, 404, 406 that divide the nodes of network 100 onto different default channels (or frequencies). Channelized neighborhood 404 includes advantaged nodes A1-A4 assigned to a default channel. As discussed previously, advantaged nodes have enhanced visibility or connectivity to other nodes in network 400, for example, an airborne node for which RF connectivity is not hindered by the presence of hills, buildings and other terrain. Advantaged nodes may also be on other platforms such as, a land-based platform, a space-based platform, a naval-based platform, etc. Channelized neighborhoods 402 and 406 include non-advantaged nodes, for example, ground based nodes. Non-advantaged nodes may also be on other platforms, such as a space-based platform, a naval-based platform, an air-based platform, etc. Each node, advantaged and non-advantaged, in network 100 may include a single simplex transceiver and an unidirectional antenna. Thus, a node cannot transmit and receive data at the same time, and a node cannot receive data from more than one node at a time.

Non-advantaged nodes may wish to use an advantaged node as a relay node to reach other non-advantaged nodes. In order to reduce congestion at the multiple access layer (MAC layer) of the advantaged nodes due to a large number of non-advantaged nodes contending for access to the advantaged node at the same time, certain non-advantaged nodes are designated as access points, e.g., access point 408 and access point 410, to an advantaged node. Access points 408, 410 are used to send traffic to and receive traffic from an advantaged node, e.g., advantaged node A1 and advantaged node A4, respectively. In addition, access points 408, 410 exchange traffic with other non-advantaged nodes within or outside their channelized neighborhood. Accordingly, an access point 408, 410 is required to participate on both the channels for the non-advantaged nodes in network 400 and the advantaged node channel.

Figure 5:
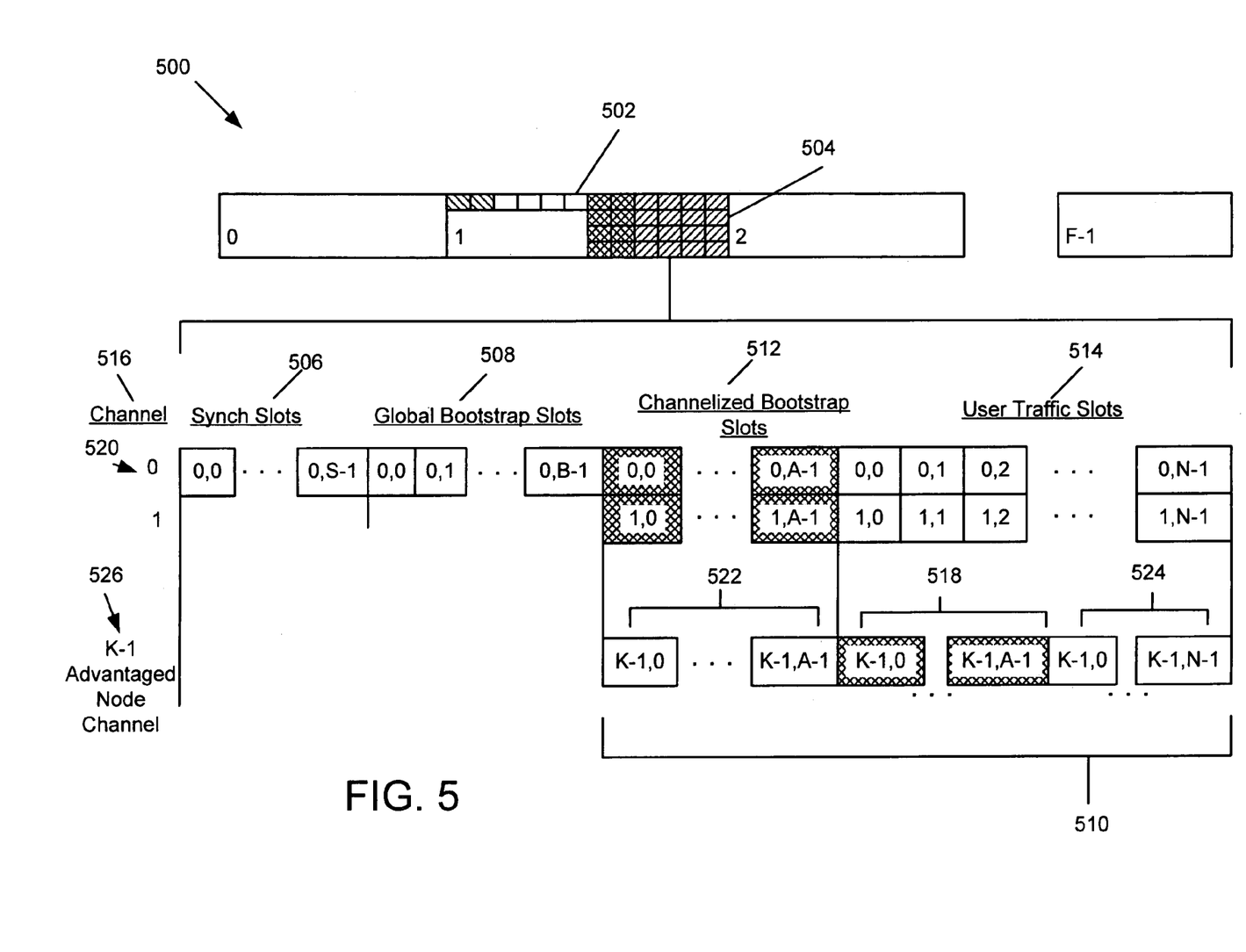
FIG. 5 is a diagram of a multi-channel TDMA structure in accordance with an embodiment.

As discussed above with respect to FIG. 1, preferably, each node communicates in accordance with a time division multiple access (TDMA) technique such as a multi-channel TDMA format, e.g., Orthogonal Domain Multiple Access (ODMA). Slot assignment may be coordinated using Unifying Slot Assignment Protocol (USAP). FIG. 5 is a diagram of a multi-channel TDMA structure in accordance with an embodiment. Multi-channel TDMA structure 500 includes a plurality of frames 502 that are associated with a plurality of non-overlapping radio frequency channels 504, 516. As mentioned above with respect to FIG. 4, nodes in network 100 are divided onto different default channels, i.e., into channelized neighborhoods. Channelized neighborhood 404 includes advantaged nodes on an advantaged node channel 526.

Each frame 502 is divided into four sections, synch slots 506, global bootstrap slots 508, channelized bootstrap slots 512, and user traffic slots 514. Each of these sections operate in a similar manner as described above with respect to FIG. 2. In addition, a global bootstrap slot 508 contains at least the following information: 1) the transmitting node's identification, 2) advantaged node status; 3) the transmitting node's channel and 4) slot assignment information (USAP information) necessary to reserve user traffic slots. The multi-channel TDMA structure shown in FIG. 5 is configured to support advantaged nodes and allow access points 408, 410 (see FIG. 4) to participate in the exchange of local channel time slot information on both their own default channel and the advantaged node channel 526 by using staggered channelized bootstrap slots on the advantaged node channel 526.

In order for an access point to exchange information on both its own default channel and the advantaged node channel 526, the access point will need to access and participate in the channelized bootstrap slots 512 on its own default channel and the channelized bootstrap slots 518 on the advantaged node channel 526. Accordingly, the advantaged node channel 526 is modified to contain a channelized bootstrap slots section 518 offset in time from and after the channelized bootstrap slots section 512 for the other channels has finished. In one embodiment, the channelized bootstrap slots section 518 of the advantaged node channel 526 may occur immediately after the channelized bootstrap slots section 512 for the other channels has finished. In alternative embodiments, there may be user traffic slots 514 that occur inbetween the channelized bootstrap slots section 512 for the other channels and the advantaged node channelized bootstrap slots section. The common channel section (506, 508) of the advantaged node channel 526 is not modified, only the channelized portion 510 of the advantaged node channel 526 in frame 502.

During a frame 502, an access point participates on the common channel 520 during synch slots 506 and global bootstrap slots 508 of frame 502. Next, the access point will switch to its default channel, e.g., channel 1 in FIG. 5, to access and participate in the channelized bootstrap slots 512 on the default channel to exchange local channel time slot assignment information. Then, the access point may switch to the advantaged node channel 526 and participate in the channelized bootstrap slots 518 of the advantaged node channel 526 to exchange local channel time slot assignment information. During the reminder of frame 502, the access point may participate in user traffic slots in any channel 516 as its reservations dictate.

During the channelized bootstrap slot section 512 of frame 502 in which channels other than the advantaged node channel 526 are used to exchange information between non-advantaged nodes (including an access point), any advantaged node or nodes in network 400 (see FIG. 4) are not active because the access points are transmitting and/or receiving in channelized bootstrap slots on their own default channels. Therefore, the access points are not available to communicate with an advantaged node. In an embodiment where there are multiple advantaged nodes on the same channel (channelized neighborhood 404 as shown in FIG. 4), the unused time slots 522 on the advantaged node channel during channelized bootstrap slots section 512 may be used to transfer data between the advantaged nodes. Transfer or transmission of data (other than reservation information) between an advantaged node and an access point, however, may only occur in the user traffic slot section 524 on the advantaged node channel 526.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method for allowing a node in a wireless communication network to access time slot assignment information on multiple channels, the node communicating in accordance with an access protocol having a common channel frame portion and a channelized frame portion, the method comprising:

assigning the node to a first channel associated with a channelized neighborhood having a plurality of nodes;

providing a plurality of staggered channelized bootstrap slot sections in the channelized frame portion, each channelized bootstrap slot section associated with a different channel and offset in time from the other channelized bootstrap slot sections;

wherein the node is configured to participate in and exchange the time slot information on the multiple channels by switching from the first channel to one of the different channels during the channelized bootstrap slot section associated with the one of the different channels.

2. A method according to claim 1, wherein the access protocol is a multi-channel time division multiple access protocol.

3. A method according to claim 2, wherein the multichannel time division access protocol is orthogonal division multiple access.

4. A method according to claim 1, wherein the common channel frame portion includes synch slots and global bootstrap slots.

5. A method according to claim 1, wherein the channelized frame portion further includes a plurality of user traffic slot sections, each user traffic slot section associated with a different channel.

6. A method according to claim 1, wherein during the channelized frame portion, the node participates in a channelized bootstrap slot section associated with the first channel and a channelized bootstrap slot section associated with at least one other channel.

7. A method for providing a non-advantaged node in a wireless communication network access to time slot assignment information on a channel associated with an advantaged node, the non-advantaged node and advantaged node communicating in accordance with an access protocol having a common channel frame portion and a channelized frame portion, the method comprising:

assigning the non-advantaged node to a first channel associated with a channelized neighborhood having a plurality of nodes;

providing a first channelized bootstrap slot section for the first channel in the channelized frame portion;

providing a second channelized bootstrap slot section for a channel associated with the advantaged node in the channelized frame portion, the second channelized bootstrap slot section offset in time from the first channelized bootstrap section; and switching the non-advantaged node to the channel associated with the advantaged node during the second channelized bootstrap slot section offset in time from the first channelized bootstrap section.

8. A method according to claim 7, wherein the advantaged node transmits data with at least one other advantaged node during the first channelized bootstrap slot section.

9. A method according to claim 7, wherein during the second channelized bootstrap slot section, the non-advantaged node exchanges local time slot assignment information with the advantaged node.

10. A method according to claim 7, wherein the access protocol is a multi-channel time division multiple access protocol.

11. A method according to claim 10, wherein the multi-channel time division access protocol is orthogonal division multiple access.

12. A method according to claim 7, wherein the common channel frame portion includes synch slots and global bootstrap slots.

13. A method according to claim 7, wherein the channelized frame portion further includes a plurality of user traffic slot sections, each user traffic slot section associated with a different channel.

14. A wireless communication network comprising:
- a plurality of channelized neighborhoods, each channelized neighborhood including a plurality of nodes assigned to a channel;
- a multi-channel time division multiple access structure having a common channel frame portion and a channelized frame portion, the multi-channel time division multiple access structure including:
  - a slot assignment protocol;
  - a plurality of synch slots in the common channel frame portion;
  - a plurality of global bootstrap slots in the common channel frame portion;
  - a plurality of staggered channelized bootstrap slot sections in the channelized frame portion, each channelized bootstrap slot section associated with a different channel and offset in time from the other channelized bootstrap slot sections; and
  - a plurality of user traffic slot sections, each user traffic slot section associated with a different channel;
  - wherein at least two of the staggered channelized bootstrap sections associated with different channels and offset in time are associated with a common node of the plurality of nodes.

15. A network in accordance with claim 14, wherein the multi-channel time division multiple access structure is an orthogonal domain multiple access structure.

16. A network according to claim 14, wherein a node assigned to a first channelized neighborhood of the plurality of channelized neighborhoods associated with a first channel accesses time slot assignment information on a first channelized bootstrap slot section associated with the first channel and on a second channelized bootstrap slot section associated with a second channel.

17. A network according to claim 14, wherein the slot assignment protocol is unifying slot assignment protocol.

18. A wireless communication network, comprising:
- at least one advantaged node;
- a plurality of non-advantaged nodes including at least one access point node, the access point node configured to communicate with the at least one advantaged node;
- a first channelized neighborhood including a first subset of the plurality of non-advantaged nodes assigned to a first channel including the access point node;
- a second channelized neighborhood including the at least one advantaged node and assigned to a second channel;
- a multi-channel time division multiple access structure having a common channel frame portion and a channelized frame portion, the multi-channel time division multiple access structure including:
  - a slot assignment protocol;
  - a plurality of synch slots in the common channel frame portion
  - a plurality of global bootstrap slots in the common channel frame portion;
  - a first channelized bootstrap slot section for the first channel in the channelized frame portion;
  - a second channelized bootstrap slot section for the second channel in the channelized frame portion, the second channelized bootstrap slot section offset in time from the first channelized bootstrap slot section;
  - a first user traffic slot section associated with the first channel; and
  - a second user traffic slot section associated with the second channel.

19. A network according to claim 18, wherein the multi-channel time division multiple access structure is an orthogonal domain multiple access structure.

20. A network according to claim 18, wherein the slot assignment protocol is unifying slot assignment protocol.

21. A network according to claim 18, further comprising a third channelized neighborhood including a second subset of the plurality of non-advantaged nodes assigned to a third channel.

22. A network according to claim 21, wherein the multi-channel time division multiple access structure further includes a third channelized bootstrap slot section for the third channel wherein the second channelized bootstrap section is offset in time from the first channelized bootstrap slot section and the third channelized bootstrap slot section.

* * * * *